US011467536B2

(12) United States Patent
Xie et al.

(10) Patent No.: US 11,467,536 B2
(45) Date of Patent: Oct. 11, 2022

(54) HOLOGRAPHIC ACOUSTIC IMAGING SYSTEMS AND DEVICES BASED ON A DYNAMIC APERTURE AND METHODS OF USE

(71) Applicant: Duke University, Durham, NC (US)

(72) Inventors: Yangbo Xie, Durham, NC (US); Steven Cummer, Durham, NC (US)

(73) Assignee: Duke University, Durham, NC (US)

( * ) Notice: Subject to any disclaimer, the term of this patent is extended or adjusted under 35 U.S.C. 154(b) by 896 days.

(21) Appl. No.: 16/327,019

(22) PCT Filed: Aug. 24, 2017

(86) PCT No.: PCT/US2017/048419
§ 371 (c)(1),
(2) Date: Feb. 21, 2019

(87) PCT Pub. No.: WO2018/039455
PCT Pub. Date: Mar. 1, 2018

(65) Prior Publication Data
US 2019/0187615 A1    Jun. 20, 2019

Related U.S. Application Data

(60) Provisional application No. 62/379,301, filed on Aug. 25, 2016.

(51) Int. Cl.
*G03H 1/22* (2006.01)
*G03H 1/02* (2006.01)
(Continued)

(52) U.S. Cl.
CPC .............. *G03H 3/00* (2013.01); *G03H 1/0808* (2013.01); *G03H 1/0891* (2013.01); *H04R 1/00* (2013.01)

(58) Field of Classification Search
CPC ...... G03H 3/00; G03H 1/0808; G03H 1/0891; H04R 1/00
(Continued)

(56) References Cited

U.S. PATENT DOCUMENTS

| 8,320,214 | B1 * | 11/2012 | Ruffa | B63G 8/42 |
| | | | | 219/202 |
| 9,640,170 | B2 * | 5/2017 | Cipolla | G10K 11/18 |
| 2016/0220850 | A1 * | 8/2016 | Tyler | A61B 5/369 |

FOREIGN PATENT DOCUMENTS

CN    105974766 A    9/2016

OTHER PUBLICATIONS

Li et al., "Metascreen-Based Acoustic Passive Phased Array," Physical Review Applied 4, 024003 (2015), 7 pp. (Year: 2015).*
(Continued)

*Primary Examiner* — Daniel L Murphy
(74) *Attorney, Agent, or Firm* — Michael Best & Friedrich LLP

(57) ABSTRACT

Systems and methods for generating a controlled sound field. In one example, the system and method perform or include receiving a sound wave emitted from a sound source; determining, with an electronic processor, a pattern of at least one of an amplitude change and a phase change necessary to create a desired sound field using the sound wave; determining, with the electronic processor, a plurality of passive sound-modulating elements needed to generate the pattern of at least one of the amplitude change and the phase change; and constructing the plurality of sound-modulating elements to generate the controlled sound field.

20 Claims, 14 Drawing Sheets

(51) Int. Cl.
*G03H 1/04* (2006.01)
*G03H 3/00* (2006.01)
*G03H 1/08* (2006.01)
*H04R 1/00* (2006.01)

(58) Field of Classification Search
USPC .......................................................... 367/8
See application file for complete search history.

(56) References Cited

OTHER PUBLICATIONS

Brunet et al., "Soft 3D acoustic metamaterial with negative index," Nat Mater, 2015, 14:384-388.
Cheng et al., "Ultra-sparse metasurface for high reflection of low-frequency sound based on artificial Mie resonances," Nat Mater, 2015, 14:1013-1019.
Cummer et al., "Controlling sound with acoustic metamaterials," Nat Rev Mater, 2016, 1:16001, 13 pages.
Di Leonardo et al., "Computer generation of optimal holograms for optical trap arrays," Opt Express, 2007, 15:1913-1922.
Fang et al., "Ultrasonic metamaterials with negative modulus," Nat Mater, 2006, 5:452-456.
Fleury et al., "An invisible acoustic sensor based on parity-time symmetry," Nat Commun, 2015, 6:5905, 7 pages.
Hertzberg et al., "Towards multifocal ultrasonic neural stimulation: pattern generation algorithms," J Neural Eng, 2010, 7:056002, 9 pages.
International Search Report and Written Opinion for Application No. PCT/US2017/048419 dated Nov. 8, 2017 (8 pages).
Kan et al., "Acoustic illusion near boundaries of arbitrary curved geometry," Sci Rep, 2013, 3:1427, 6 pages.
Lai et al., "Illusion optics: the optical transformation of an object into another object," Phys Rev Lett, 2009, 102:253902, 4 pages.
Layman et al., "Highly anisotropic elements for acoustic pentamode applications," Phys Rev Lett, 2013, 111:024302-1-024302-5.
Lemoult et al., "Wave propagation control at the deep subwavelength scale in metamaterials," Nat Phys, 2013, 9:55-60.
Li et al., "Experimental demonstration of an acoustic magnifying hyperlens," Nat Mater, 2009, 8:931-934.
Liang et al., "Extreme Acoustic Metamaterial by Coiling Up Space," Phys. Rev. Lett., 2012, 108:114301, 4 pages.
Liu et al., "Locally resonant sonic materials," Science, 2000, 289:1734-1736.
Ma et al., "Acoustic metamaterials: From local resonances to broad horizons," Sci Adv, 2016, 2:e1501595, 16 pages.
Marzo et al., "Holographic acoustic elements for manipulation of levitated objects," Nat Commun, 2015, 6:8661, 7 pages.
Norris, "Acoustic metafluids," J Acoust Soc Am, 2009, 125:839-849.
Popa et al., "Active acoustic metamaterials reconfigurable in real-time," <https://arxiv.org/abs/1505.00453v1> 2015.
Popa et al., "Non-reciprocal and highly nonlinear active acoustic metamaterials," Nat Commun, 2014, 5:3398, 5 pages.
Roes et al., "Acoustic energy transfer: a review," IEEE Trans Ind Electron, 2013, 60:242-248.
Silva et al., "Performing mathematical operations with metamaterials," Science, 2014, 343:160-163.
Xie et al., "Acoustic Holographic Rendering with Two-dimensional Metamaterial-based Passive Phased Array," <https:arxiv.org/abs/1607.06014> 2016.
Xie et al., "Measurement of a broadband negative index with space-coiling acoustic metamaterials," Phys Rev Lett, 2013, 110:175501, 4 pages.
Xie et al., "Single-sensor multispeaker listening with acoustic metamaterials," Proceedings of the National Academy of Sciences, 2015, 112:10595-10598.
Xie et al., "Tapered labyrinthine acoustic metamaterials for broadband impedance matching," Appl Phys Lett, 2013, 103:201906, 4 pages.
Xie et al., "Wavefront modulation and subwavelength diffractive acoustics with an acoustic metasurface," Nat Commun, 2014, 5:5553, 5 pages.
Zigoneanu et al., "Three-dimensional broadband omnidirectional acoustic ground cloak," Nature Mater, 2014, 13:352-355.

\* cited by examiner

HOLOGRAPHIC ACOUSTIC IMAGING SYSTEMS AND DEVICES BASED ON A DYNAMIC APERTURE AND METHODS OF USE

CROSS-REFERENCE TO RELATED APPLICATION

This application is the U.S. national stage entry, under 35 U.S.C. § 371, of international application number PCT/US2017/048419, filed Aug. 24, 2017, which claims priority to U.S. Provisional Patent Application No. 62/379,301, filed Aug. 25, 2016, the entire contents of which are hereby incorporated by reference.

BACKGROUND

Holography is a technique to record and reconstruct the complete information of wave fields. Various forms of holography have found applications intimately associated with our daily lives. For example, optical holograms have been widely applied in virtual reality displays, data storage, sensing, and security printing. Acoustic holograms, on the other hand, are relatively less developed compared to their electromagnetic counterparts in terms of applications. One of the major restricting factors is the limited acoustic properties that natural or traditional materials can offer. Acoustic holographic reconstruction has been long desired for various applications in audio rendering, imaging, sensing and virtual reality systems. Conventional approaches to acoustic holographic reconstruction rely on a large number of active transducers and phase shifting circuits that make acoustic holography systems and methods complex and cumbersome.

SUMMARY

The present disclosure provides, in part, systems and methods that allow for the generation of an acoustic hologram based on passive acoustic metamaterials and in complete analogy with optical holography. Advanced control over acoustic waves (from audible sound to medical ultrasound), such as multifocal lensing, multiplexed sensing and rendering of three-dimensional complex sound fields, can be achieved with the systems and methods provided herein.

Systems and methods provided herein allow for using passive acoustic metamaterials as subwavelength pixels to achieve holographic reconstruction with only a single transducer, without cumbersome circuitry and thus significantly reduced system complexity and power consumption. Such acoustic metasurface-based holograms can serve as versatile platforms for various advanced acoustic wave manipulation and signal modulation, leading to new possibilities in acoustic sensing, energy deposition, medical diagnostic imaging and haptic holography.

To date, most acoustic holographic reconstruction techniques rely on transducer arrays with large numbers of active elements, requiring sophisticated phase shifting circuits, large power consumption and careful calibration and tuning. On the other hand, passive acoustic holograms, that are similar to conventional optical holograms, can greatly simplify the system and significantly reduce the overall cost. Moreover, the acoustic metamaterial-based hologram pixels are only typically about 20% of the interested wavelength, enabling precise subwavelength control over the amplitude and phase of the acoustic waves. Furthermore, the hologram described herein is a subwavelength-thin flat surface device, much more compact than the conventional bulky active systems.

The design of the hologram was aided by an iterative hologram generation and optimization algorithm, and also verified with two numerical simulation tools. The desired phase patterns were physically realized with tailored labyrinthine acoustic metamaterial unit cells we invented. The inventors have already experimentally demonstrated our invention around 4 kHz audible frequency range. In this frequency range, metamaterials as hologram pixels were 3D printed and assembled into a hologram. Such holograms can also be applied to the airborne ultrasonic regime (20 to 120 kHz) by simply scaling the dimensions proportionally.

In one example, the systems and methods perform or include receiving a sound wave emitted from a sound source; determining, with an electronic processor, a pattern of at least one of an amplitude change and a phase change necessary to create a desired sound field using the sound wave (either through the reflection or transmission of the sound wave); determining, with the electronic processor, a plurality of passive sound-modulating elements needed to generate the pattern of at least one of the amplitude change and the phase change; and constructing the plurality of sound-modulating elements to generate the controlled sound field.

Another aspect off the present disclosure provides a holographic imaging system for generating a controlled sound field. The holographic imaging system includes a sound source generating a sound wave. The holographic imaging system also includes a metamaterial-based device including plurality of passive sound-modulating elements to generate a pattern of at least one of the amplitude change and the phase change necessary to create a desired sound field using the sound wave (either through the reflection or transmission of the sound wave). The plurality of passive sound-modulating elements further includes a plurality of labyrinthine structures. The holographic imaging system also includes an image plane to capture and verify the desired sound field.

Yet another aspect of the present disclosure provides a non-transitory computer-readable medium containing computer-executable instructions that when executed by one or more processors cause the one or more processors to determine a pattern of at least one of an amplitude change and a phase change necessary to create a desired sound field; determine a plurality of passive sound-modulating elements needed to generate the pattern of at least one of the amplitude change and the phase change; and construct the plurality of sound-modulating elements to generate the sound field.

BRIEF DESCRIPTION OF THE DRAWINGS

The foregoing aspects and other features of the disclosure are explained in the following description, taken in connection with the accompanying drawings, herein. The accompanying figures, where like reference numerals refer to identical or functionally similar elements throughout the separate views, together with the detailed description below, are incorporated in and form part of the application, and serve to further illustrate embodiments of concepts that include the claimed invention, and explain various principles and advantages of those embodiments.

Figure 1:
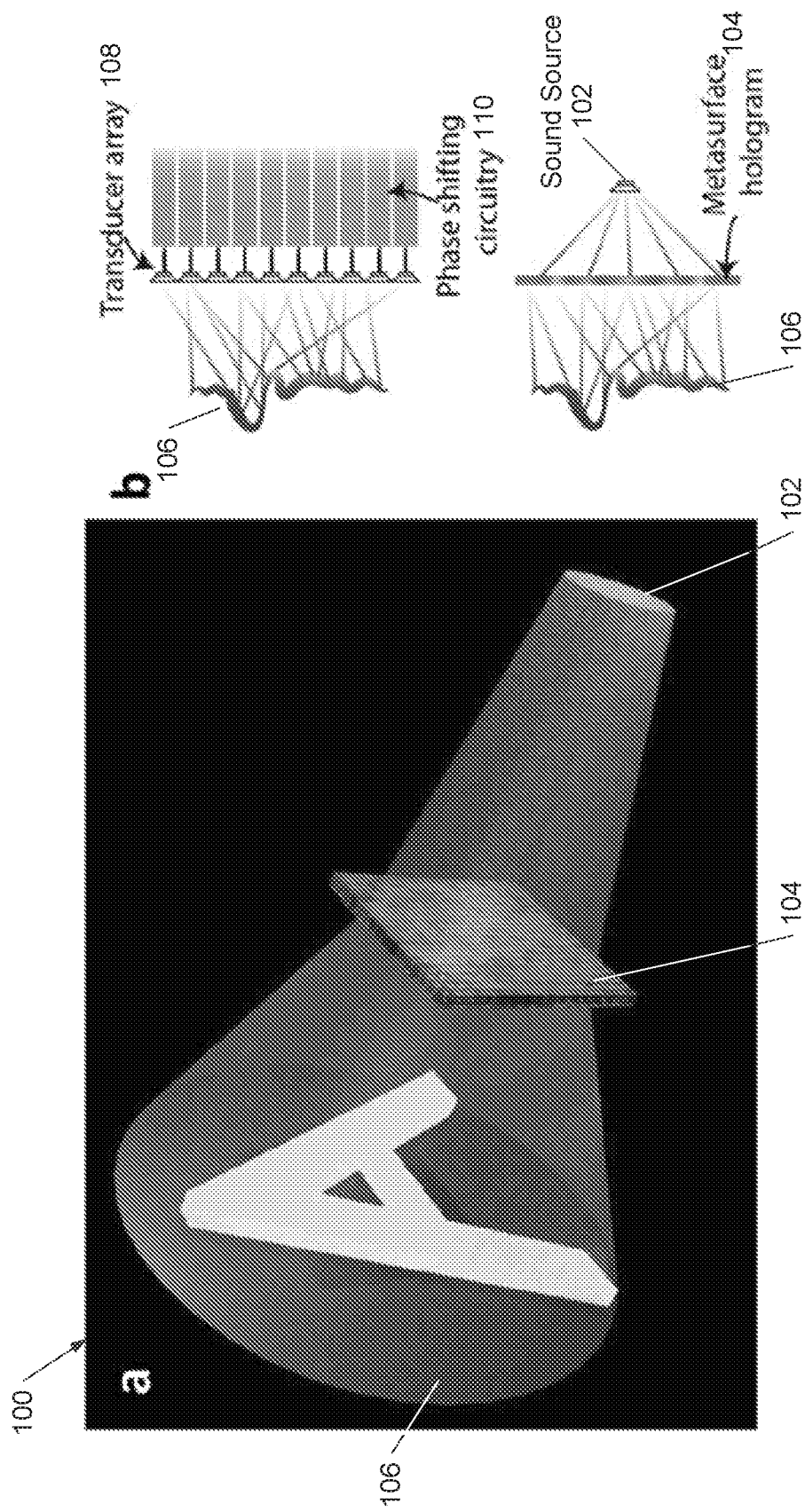
FIG. 1a illustrates a schematic showing the holographic reconstruction of a letter 'A' with the passive acoustic metamaterial-based hologram, in accordance with some embodiments.
FIG. 1b shows a comparison between holographic reconstruction with an active phase array and passive acoustic meta-surface that eliminates the cumbersome phase-shifting electronics, power supply and a large number of transducers, in accordance with some embodiments.

Skilled artisans will appreciate that elements in the figures are illustrated for simplicity and clarity and have not necessarily been drawn to scale. For example, the dimensions of the elements in the figures may be exaggerated relative to other elements to help to improve understanding of embodiments provided herein.

DETAILED DESCRIPTION

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates. The invention is capable of other embodiments and of being practiced or of being carried out in various ways. Some embodiments may be a machine-implemented method, a tangible machine-readable medium having a set of instructions detailing a method stored thereon for at least one processor for a computing device.

Articles "a" and "an" are used herein to refer to one or to more than one (i.e., at least one) of the grammatical object of the article. By way of example, "an element" means at least one element and can include more than one element. Unless otherwise defined, all technical terms used herein have the same meaning as commonly understood by one of ordinary skill in the art to which this disclosure belongs.

Systems and methods provided herein show that by using passive acoustic metamaterials as subwavelength pixels, holographic reconstruction can be achieved with only a single transducer, without cumbersome circuitry and thus significantly reduced system complexity and power consumption. To date, most acoustic holographic reconstruction techniques rely on transducer arrays with large numbers of active elements, requiring sophisticated phase shifting circuits, large power consumption and careful calibration and tuning. Therefore, passive acoustic holograms, that are similar to conventional optical holograms, are highly desired.

Such acoustic metasurface holograms can serve as versatile platforms for various advanced acoustic wave manipulation and signal modulation, leading to new possibilities in acoustic sensing, energy deposition and medical diagnostic imaging.

Acoustic holograms require a range of acoustic materials that possess a broad spectrum of properties, in order to achieve a large range of spatial modulation on the amplitude and phase of acoustic waves. While natural materials fall short in this respect, acoustic metamaterials offer a remedy to such quest. Acoustic metamaterials are artificial materials, whose micro-structures are carefully engineered, to provide flexible and unusual material properties. They are the building blocks for a large variety of unconventional acoustic wave controlling and sensing devices, such as hyperbolic lenses, acoustic metasurfaces, scattering-reduction cloaks and acoustic metamaterial sensors. A hologram can be realized with pixel-by-pixel modulation of the phase or/and the amplitude on the acoustic waves. Investigated herein are phase holograms whose transmission amplitude is assumed to be uniform over the plane of the hologram.

FIG. 1a illustrates a system 100 showing the holographic reconstruction of a letter 'A' on an image plane 106 using a passive acoustic metamaterial-based hologram 104 that receives acoustic energy from a sound source 102, in accordance with some embodiments.

FIG. 1b shows a comparison between holographic reconstruction using an active phase array (including a transducer array 108 and a phase shifting circuitry 110) and a passive acoustic metamaterial-based hologram 104 that eliminates the cumbersome phase-shifting electronics, power supply and a large number of transducers, in accordance with some embodiments.

Figure 2:
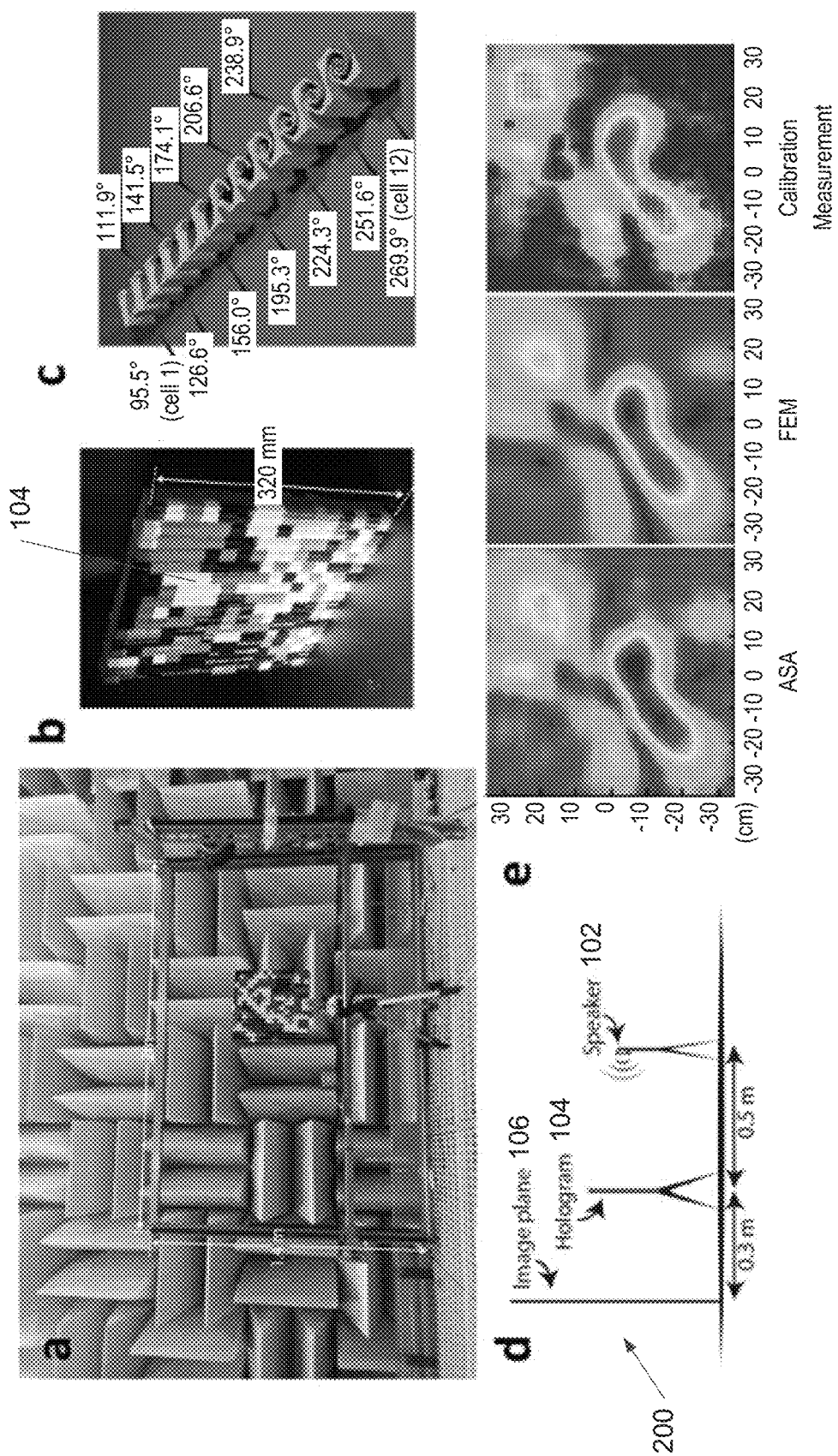
FIG. 2a shows a photograph of an experimental setup of measuring the holographic reconstruction of the acoustic meta-surface holograms, in accordance with some embodiments.
FIG. 2b shows a photograph of a fabricated hologram that is composed of 512 unit cells, in accordance with some embodiments.
FIG. 2c illustrates a set of 12 constituting unit cells used to achieve gradient phase delays, in accordance with some embodiments.
FIG. 2d illustrates the layout of the holographic reconstruction system, in accordance with some embodiments.
FIG. 2e shows simulated results of a random calibration hologram with angular spectrum approach (ASA) and Finite Element Method (FEM)-based full wave simulation, as well as the corresponding measurement.

FIG. 2a shows a photograph of an experimental setup of measuring the holographic reconstruction of the acoustic meta-surface holograms, in accordance with some embodiments.

Systems and methods provided herein describe experimental realizations of two acoustic metasurface holograms: one projects a letter 'A' pattern on the image plane, while the other focuses energy onto multiple circular spots of different sizes. The design of the metamaterial used for the acoustic metasurface holograms generated herein was aided by an iterative hologram generation and optimization algorithm, and also verified with two numerical simulation tools. The desired phase patterns were physically realized with tailored labyrinthine acoustic metamaterial unit cells. The experimental testing of the holographic reconstructions was carried out in an anechoic chamber. Excellent agreement was found between the measured holographic reconstruction and the desired patterns. Such acoustic metasurface holograms are not only direct acoustic analogues of optical computer generated holograms, but pave the way to advanced acoustic wave manipulation and complex field reconstruction using passive acoustic metamaterials without the need of phase-shifting circuitry and transducer arrays.

FIG. 2b shows a photograph of a fabricated hologram (using a passive metamaterial-based hologram 104) that is composed of 512 unit cells, in accordance with some embodiments. FIG. 2c illustrates a set of 12 constituting unit cells used to achieve gradient phase delays, in accordance with some embodiments. FIG. 2d illustrates the layout of the holographic reconstruction system 200, in accordance with some embodiments. As shown in FIG. 2d, the system 200 includes a speaker 102, a passive metamaterial-based hologram 104, and an image plane 106. FIG. 2e shows simulated results of a random calibration hologram with an angular spectrum approach (ASA) and Finite Element Method (FEM)-based full wave simulation, as well as the corresponding measurement. The structure of a fabricated hologram is shown in FIG. 2c wherein, the colors of the unit cells are randomly selected during a 3D printing process and does not reflect the types of the unit cells.

The experiment setup to verify the proposed acoustic metamaterial hologram is depicted in FIGS. 2a and 2d. The hologram is mounted securely in an aperture in a large sheet of hard paperboard. Since the acoustic impedance of the paperboard is much larger than that of air, it is assumed to be acoustically rigid and prevents sound from bypassing the hologram. To generate the desired acoustic field, a loudspeaker sends out Gaussian-enveloped sinusoidal pulses with a center frequency at 4000 Hz towards the hologram. A moving microphone placed on the 2-D scanning stage with a scanning-step of 20 mm is used to measure the acoustic field at various depths behind the hologram. The acoustic pressure at each point is averaged from five independent measurements to reduce the noise.

The hologram design scheme and the experimental setup is verified by measuring first a randomly patterned hologram and comparing the measurements using the two aforementioned simulation tools. Excellent agreement was found between the measured field at 30 cm and those in COMSOL simulation as well as angular spectrum calculation, as shown in FIG. 2e. The agreement demonstrates that the design method is effective and the verifying simulation tools can faithfully predict the projected field patterns to the extent of even some smaller features.

Figure 3:
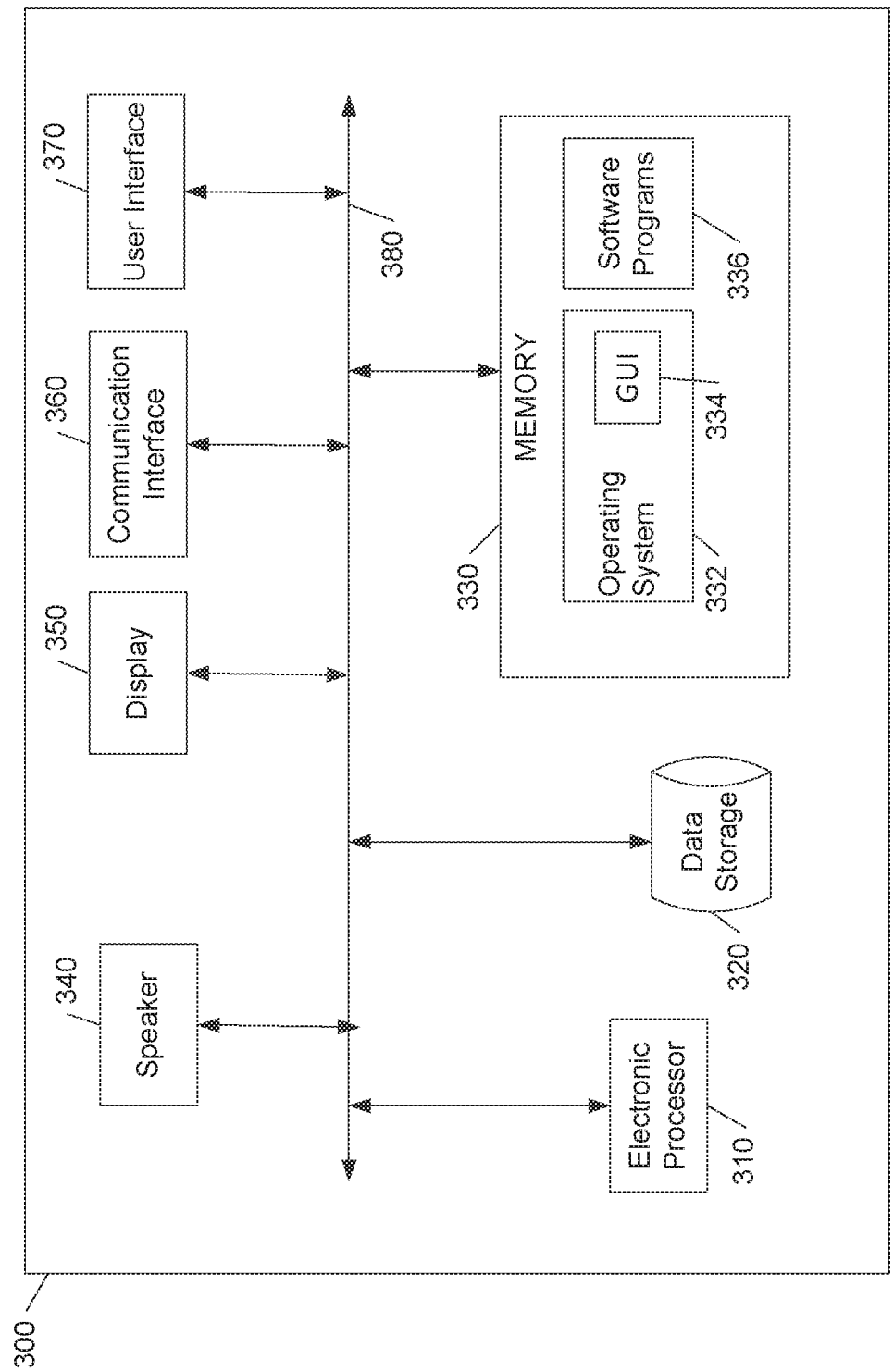
FIG. 3 illustrates a block diagram of a computing device, in accordance with some embodiments.

To demonstrate the capability of our proposed acoustic metasurface-based hologram for creating acoustic 'illusions' for imagers, we designed a hologram that projects the amplitude pattern of the letter 'A' in an image plane 300 mm behind the hologram. FIG. 3 illustrates a block diagram of a computing device 300, in accordance with some embodiments. The computing device 300 may combine hardware, software, and firmware to implement the method for designing a passive metamaterial-based hologram 104 based on determining a pattern of at least one of an amplitude change and a phase change necessary to create a desired sound field using a sound wave as provided herein. In some embodiments, the computing device 300 includes an electronic processor 310, a data storage 320, a memory 330, a speaker 340, a display 350, a communication interface 360, a user interface 370 that can be hardware-based (for example, electronic mouse, keyboard, trackball, stylus, touch-pad, touchscreen, etc.) or software-based and a bus 380. In one embodiment, the electronic processor 310 may include at least one microprocessor and be in communication with at least one microprocessor. The electronic processor 310 interprets and executes a set of instructions stored in the memory 330. In some embodiments, the memory, 330 includes, for example, random access memory (RAM), read-only memory (ROM), and combinations thereof. In some embodiments, the memory 330 has a distributed architecture, where various components are situated remotely from one another, but may be accessed by the electronic processor 310.

The data storage device 320 may include a non-transitory, machine-readable storage medium that stores, for example, one or more databases. In one example, the data storage device 320 also stores executable programs, for example, a set of instructions that when executed by one or more electronic processors cause the one or more electronic processors to perform the one or more methods described herein. In one example, the data storage device 320 is located external to the computing device 300.

The memory 330 includes an operating system 332 and software programs 336. The operating system 332 includes a graphical user interface 334. In some embodiments, the software programs 336 include a hologram generation algorithm as described herein.

The communication interface 360 provides the computing device 300 a communication gateway with an external network (for example, a wireless network, the internet, etc.). The communication interface 360 may include, for example, an Ethernet card or adapter or a wireless local area network (WLAN) integrated circuit, card or adapter (for example, IEEE standard 802.11 a/b/g/n). The communication interface 360 may include address, control, and/or data connections to enable appropriate communications with the external network.

The user interface 370 provides a mechanism for a user to interact with the computing device 300. As noted above, the user interface 370 includes input devices such as a keyboard, a mouse, a touch-pad device, and others. In some embodiments, the display 350 may be part of the user interface 370 and may be a touchscreen display. In some embodiments, the user interface 370 may also interact with or be controlled by software programs including speech-to-text and text-to-speech interfaces. In some embodiments, the user interface 370 includes a command language interface, for example, a software-generated command language interface that includes elements configured to accept user inputs, for example, program-specific instructions or data. In some embodiments, the software-generated components of the user interface 370 include menus that a user may use to choose particular commands from lists displayed on the display 350.

The bus 380, or other component interconnection, provides one or more communication links among the components of the computing device 300. The bus 380 may be, for example, one or more buses or other wired or wireless connections. The bus 380 may have additional elements, which are omitted for simplicity, such as controllers, buffers (for example, caches), drivers, repeaters, and receivers, or other similar components, to enable communications. The bus 380 may also have address, control, and data connections, or a combination of the foregoing to enable appropriate communications among the aforementioned components.

In some embodiments, the electronic processor 310, and the memory 330 are included in a single computing device (for example, within a common housing). In these embodiments, the electronic processor 310 executes a software program that is locally stored in the memory 330 to perform the methods described herein. Alternatively or in addition, the electronic processor 310 may execute the software application to access data stored external to the computing device (for example, on a server accessible over a communication network such as the internet). The electronic processor 310 may output the results of processing the accessed data to the display 350 included in the computing device 300. In some embodiments, the electronic processor 310 may be included in the server or another device that communicates with the server or a wired or wireless network for connection.

Figure 4:
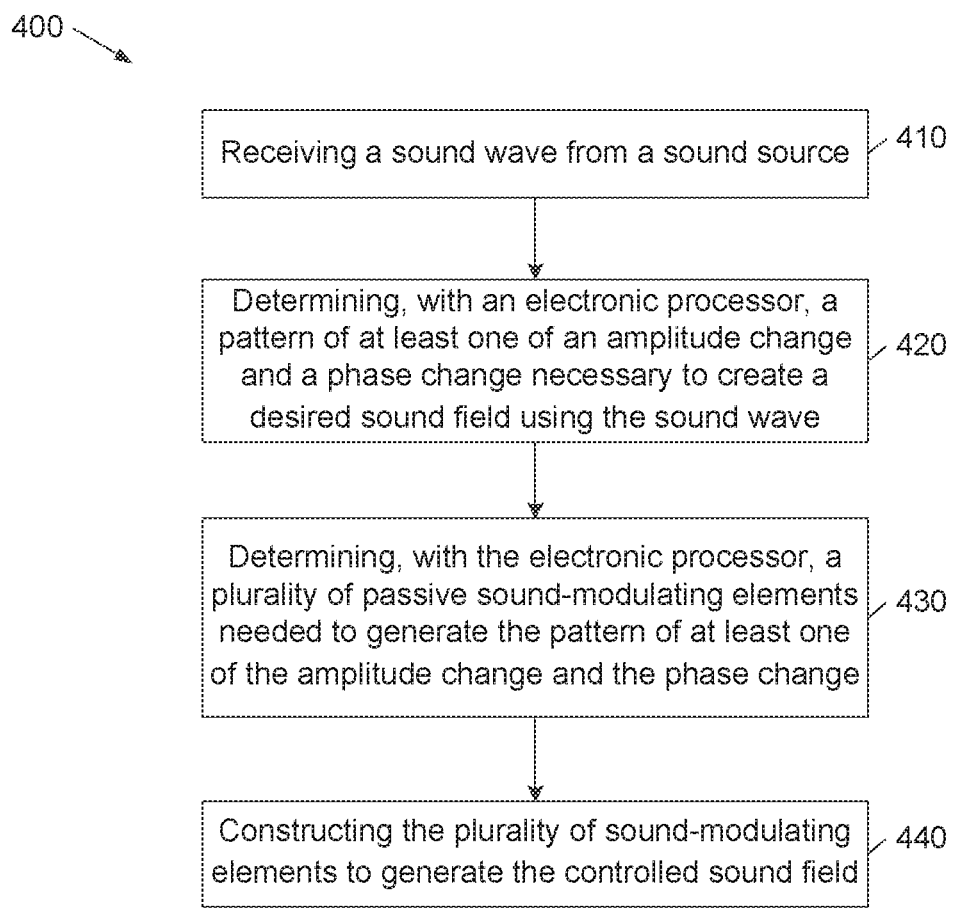
FIG. 4 illustrates a flow diagram of a method for generating a controlled sound field, in accordance with some embodiments.

FIG. 4 illustrates a flow diagram of a method 400 for generating a controlled sound field, in accordance with some embodiments. At block 410, the method includes receiving a sound wave from a sound source 102.

At block 420, the method 400 includes determining, with an electronic processor 310, a pattern of at least one of an amplitude change and a phase change necessary to create a desired sound field using the sound wave from the sound source 102. In some embodiments, the sound source 102 is used to generate a sound wave that can propagate through a liquid medium. In some other embodiments, the sound source 102 is used to generate a sound wave that can propagate through an organic tissue.

At block 430, the method 400 includes determining, with the electronic processor 310, a plurality of passive sound-modulating elements needed to generate the pattern of at least one of the amplitude change and the phase change. In one example, the plurality of passive sound-modulating elements include a plurality of labyrinthine structures. In some embodiments, determining the plurality of passive sound modulating elements includes reconfiguring the plurality of passive sound-modulating elements to generate the pattern of at least one of the amplitude change and the phase change. In some embodiments, determining the plurality of passive sound-modulating elements includes determining the dimensions of an array, of the plurality of passive sound-modulating elements that are perpendicular to the direction of the sound wave. In some embodiments, the dimensions of each of the plurality of passive sound-modulating elements are smaller than the wavelength of the sound wave from the sound source 102.

Figure 7:
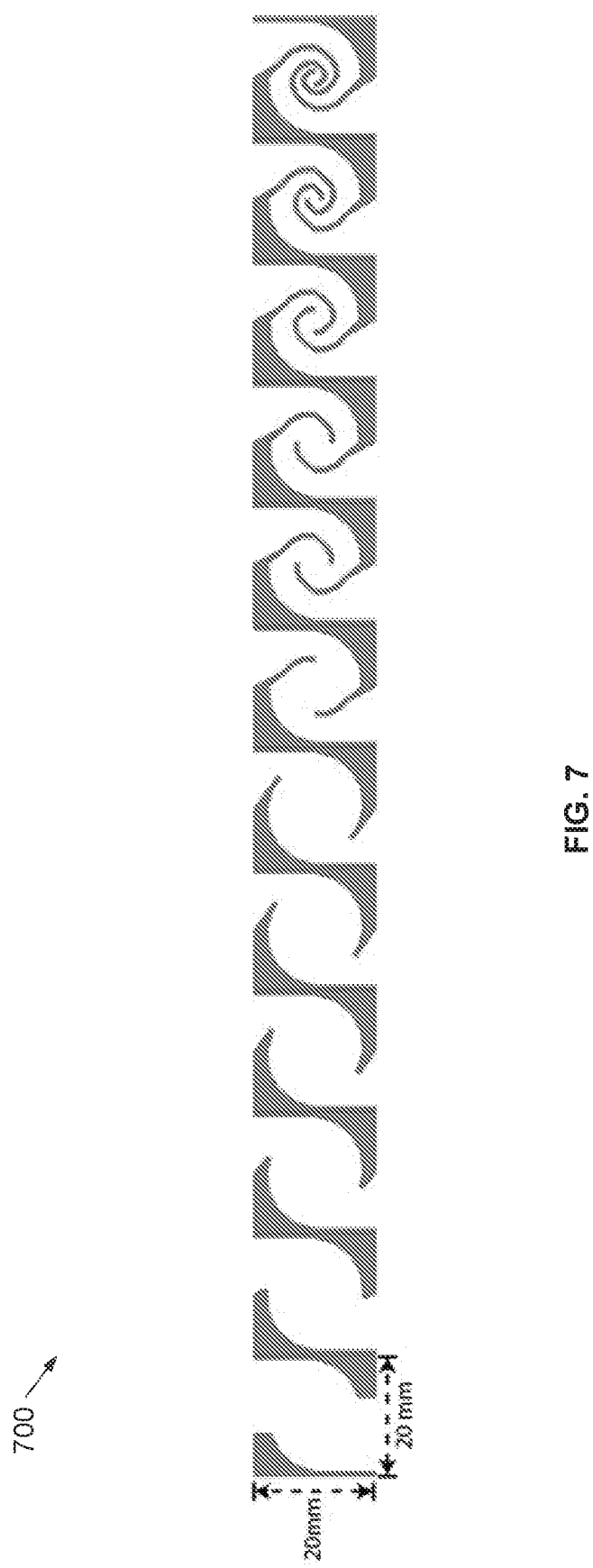
FIG. 7 illustrates detailed geometries of 12 types of labyrinthine metamaterials used in the demonstration of the acoustic hologram in accordance with some embodiments.

At block 440, the 400 method includes constructing the plurality of sound-modulating elements as shown in FIG. 7) to generate the controlled sound field. In some embodiments, constructing the plurality of sound-modulating elements to generate the sound field includes constructing the plurality of sound-modulating elements using a three dimensional printer.

Figure 5:
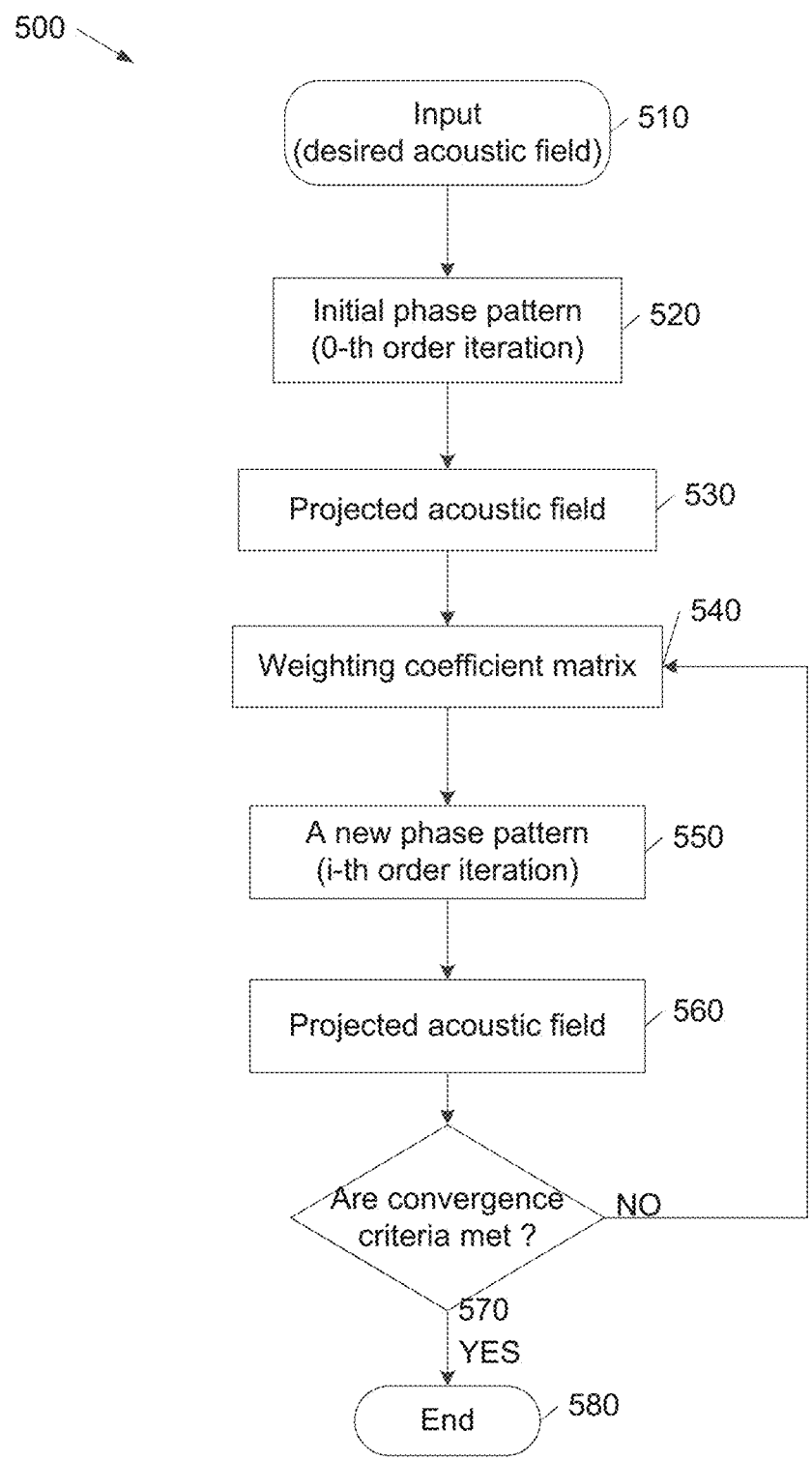
FIG. 5 illustrates a flow diagram of a hologram generation algorithm, in accordance with some embodiments.

FIG. 5 illustrates a flow diagram 500 of a hologram generation algorithm, in accordance with some embodiments. At block 510, the algorithm receives input parameters for the desired acoustic field. In one example, the Weighted Gerchberg-Saxton (GSW) algorithm that was previously used for designing optical trap arrays has been modified and used here to generate the optimal phase distribution of the hologram. An initial phase pattern of the hologram (0-th iteration) 520 was first generated and provided to the hologram generation algorithm. In one example, the initial iteration can be the phase pattern of a back-propagated field from the image plane 106 to the hologram 104. A spatial impulse response-based acoustic field simulation tool (for example, Field II) is employed to calculate the projected field (at block 530) on the image plane and integrated with the Weighted Gerchberg-Saxton algorithm (at block 540) to perform hologram optimization. By optimizing the spatial pattern of the amplitude on the image plane iteratively, the optimal phase distribution needed for certain reconstruction is obtained. Finally, by compensating for the phase differences from the point source to the pixels of the hologram, the phase delay for all the pixels can be calculated. At block 570 the algorithm checks whether the convergence criteria have been met. When the convergence criteria are met, the algorithm proceeds to end (at block 580). When the convergence criteria are not met, the algorithm proceeds to block 540.

The optimized design was verified with two numerical simulation tools: one is the angular spectrum approach (ASA), and the other is a Finite Element Method (FEM)-based full wave simulation package (for example, COMSOL Multiphysics). Angular spectrum approach is a well-established technique and is able to accurately predict the sound field at a distance from the initial plane. The essential idea of angular spectrum approach involves decomposing the initial pressure field into plane waves with different wave-vectors and subsequently propagating these plane waves using analytical formula. The simplicity of angular spectrum approach and the fact that it uses Fast Fourier Transform (FFT) renders it highly efficient for predicting the holographic reconstruction at different depths. Additionally, excellent agreement was found between the predictions by angular spectrum approach and the Finite Element Method. The angular spectrum approach is used herein as the primary simulation tool for comparison with the measured results.

Computer Algorithm for Calculating the Phase Patterns of the Acoustic Holograms

An iterative hologram generation computer algorithm is provided herein based on the weighted Gerchberg-Saxton, or GSW method developed by Di Leonardo, R., Ianni, F., and Ruocco, G in 2007, entitled "Computer generation of optical holograms for optical trap arrays," in Opt. Express 15, 1913-1922, incorporated herein by reference.

The iterative hologram generation computer algorithm computes the optimal phase for each element (assuming the amplitude of each element to be uniform on the source plane).

Consider an array of acoustic sources with N elements, the sound pressure at the m-th target (m=1, 2, . . . , M) can be calculated by propagating each source element to it:

$$p_m = i\frac{\rho ckS}{2\pi}\sum_n a_n e^{i\varphi_n}\frac{e^{-ikd_{mn}}}{d_{mn}} \quad (1)$$

Where $a_n$ and $\varphi_n$ are the amplitude and phase of the radiating velocity of the n-th element on the source surface, respectively; $d_{mn}$ is the distance between the n-th element and m-th target; $\rho$ and c are the density and sound speed of the background medium, respectively; k is the wave number; S is the surface area of each element, Expressing Equation (1) with matrix notation: P=HU, where P and U are the M×1 and N×1 pressure vectors at each target and source element, H is the transferring matrix given by $$H(m, n) = iK\frac{e^{-ikd_{mn}}}{d_{mn}} \quad (2)$$

Where $$K = \frac{\rho ckS}{2\pi}$$

is considered to be constant since the source surface areas are identical, so that we throw away the constant terms K and $a_n$, and the total radiation delivered to each target can be simplified as:

$$p_m = \sum_n \frac{e^{i(\varphi_n - kd_{mn})}}{d_{mn}} \quad (3)$$

Next an iterative process is employed in order to minimize the non-uniformity of the amplitude of the non-zero elements on the projected image plane. A weighting coefficient $w_m$, thereby, is introduced for each target. The mean amplitude of all the non-zero elements on the image plane can be expressed as $$\langle p \rangle = \frac{1}{M}\sum_m w_m \left|\sum_n \frac{e^{i(\varphi_n - kd_{mn})}}{d_{mn}}\right|$$

and the iterative process is as follows:

Initial ($0^{th}$) step: $w_m^0 = 1$;

$1^{st}$ step:

$$w_m^1 = \frac{\langle |p^0| \rangle}{|p_m^0|};$$

$2^{nd}$ step:

$$w_m^2 = w_m^1 \frac{\langle |p^1| \rangle}{|p_m^1|};$$

...

$k^{th}$ step:

$$w_m^k = w_m^{k-1} \frac{\langle |p^{k-1}| \rangle}{|p_m^{k-1}|}$$

Eventually the optimal solution for the phase of each element can be calculated as:

$$\varphi_n = \arg\left\{\sum_m w_m e^{ikd_{mn}}\frac{p_m}{|p_m|}\right\} \quad (4)$$

And the convergence criteria is set as $$\frac{\min\{|p_1|, |p_2|, \ldots, |p_m|\}}{\max\{|p_1|, |p_2|, \ldots, |p_m|\}} < \delta^{stop}.$$

Angular Spectrum Approach (ASA) of the Holographic Reconstructions

To facilitate the hologram design process and verify the GSW-based designs, Angular Spectrum approach is employed. The complex field of the object plane (0 cm behind the hologram, $Z=Z_{obj}$) was decomposed into components with various spatial frequencies, and then propagated to the image plane ($Z=Z_{img}$ and 30 cm behind the hologram in our cases) by multiplying corresponding phase delay terms:

$$P(f_x, f_y; Z_{img}) = P(f_x, f_y; z_{obj})e^{j\sqrt{k_0^2 - f_x^2 - f_y^2}(z_{img} - z_{obj})},$$

where, $P(f_x, f_y; z_{obj})$ is the Fourier component with spatial frequencies $f_x$ and $f_y$ in both dimensions on the object plane and $P(f_x, f_y; z_{img})$ is the projected Fourier component on the image plane. The complex field on the image plane can be reconstructed by performing an inverse Fourier Transform of all the Fourier components.

Figure 6:
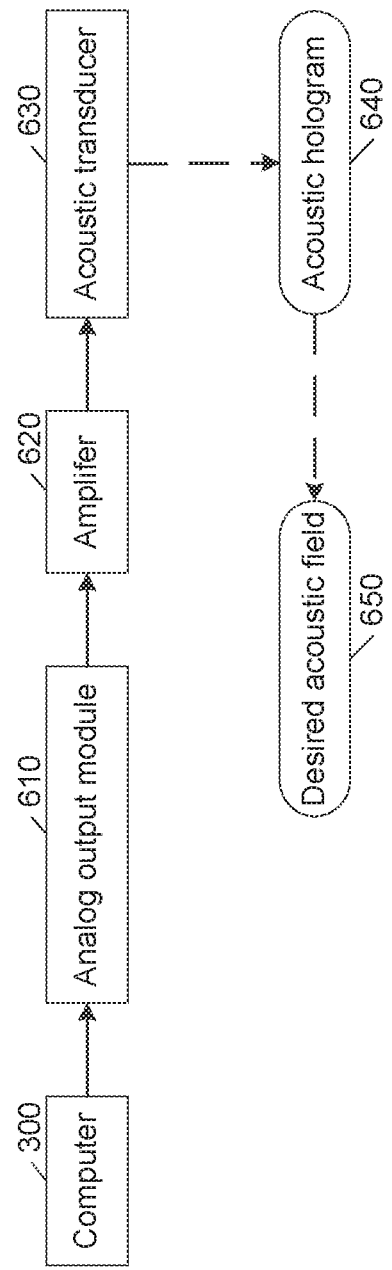
FIG. 6 illustrates a signal flow diagram for a rendering process of a desired holographic sound, in accordance with some embodiments.

FIG. 6 illustrates a signal flow diagram for a rendering process of a desired holographic sound, in accordance with some embodiments. In some embodiments, the computer 300 is configured to generate an analog voltage output from an analog output module 610 that is powered by an amplifier 620 to generate an amplified electric signal. The amplified electric signal from the amplifier 620 is provided to an acoustic transducer 630 and converted to acoustic energy. The emitted acoustic energy illuminates upon an acoustic hologram 640 and forms the desired acoustic field 650.

Anechoic Chamber Measurement of the Holographic Reconstructions

The measurement was performed in an anechoic chamber to prevent the reverberation caused by the environment. The experimental setup is depicted in FIG. 2*d*, where a single speaker acting as a point source emitted a Gaussian modulated sinusoidal pulse centered at 4 kHz towards the hologram. A scanning stage behind the hologram, with a microelectromechanical microphone mounted on the bearing towards the hologram, measured the projected field on the image plane in a point-by-point fashion. The measurement at each position on the image plane was averaged over three times. Measured field patterns were then obtained from time domain measurements via Fourier transform.

FIG. 7 illustrates detailed geometries of 12 types of labyrinthine metamaterials that form a plurality of sound-modulating elements that is used in the demonstration of the acoustic hologram in accordance with some embodiments. To realize the phase delay profile required by the hologram a set of 12 labyrinthine unit cells was designed and optimized for the hologram, with gradient transmission phase delays and relatively constant transmission amplitudes (see also FIG. 2*c* that illustrates a set of unit cells). Labyrinthine unit cells are a family of geometry-based non-resonant acoustic metamaterials that have been proposed recently. They have been shown to possess various attractive features for acoustic metasurfaces (that are either transmissive or reflective) namely precise phase control, high transmission or reflection, and relatively broad bandwidth due to their non-resonant nature. The set of 12 unit cells, as shown in FIG. 7, is designed for 4000 Hz covering 180 degrees of relative phase delay. Two layers of unit cells achieve a complete angular coverage of 360 degrees of relative phase change across the hologram. The unit cells are fabricated with acrylonitrile butadiene styrene (ABS) plastics using the fused filament fabrication (FFF) 3D printing technology.

Figure 8:
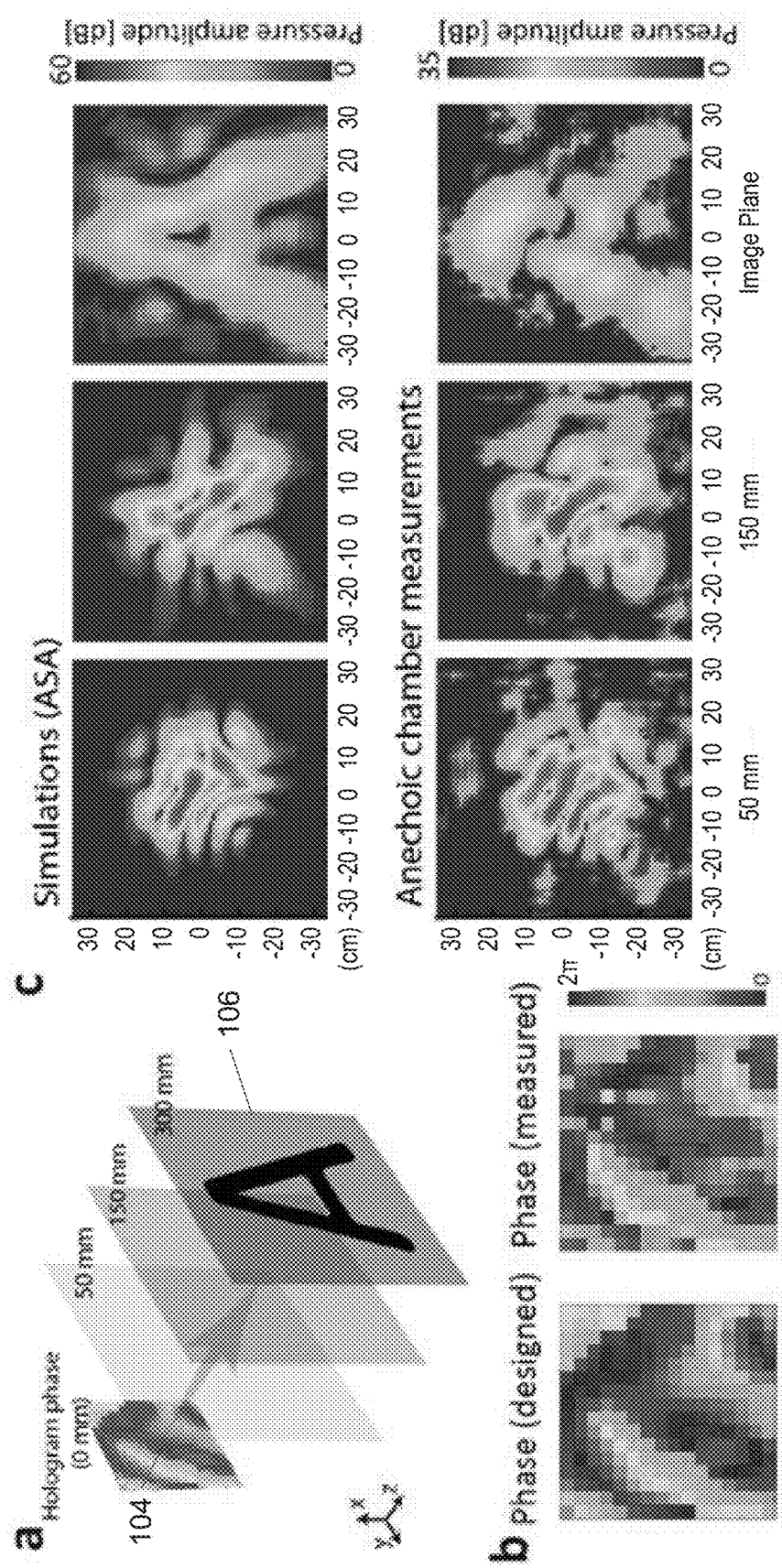
FIG. 8a shows the experimental results of a holographic reconstruction of a letter 'A' (a desired pattern) to be reconstructed at the depth of 300 mm, in accordance with some embodiments.
FIG. 8b shows an ideal phase pattern designed with the Weighted Gerchberg-Saxton (GSW) method and the actually measured phase pattern immediately behind the hologram, in accordance with some embodiments.
FIG. 8c shows the simulated field patterns (amplitude) at three representative depths compared to those actually measured, in accordance with some embodiments.

FIG. 8*a* shows the experimental results of a holographic reconstruction of a letter 'A' (a desired pattern) to be reconstructed at the depth of 300 mm, in accordance with some embodiments. FIG. 8*a* shows the desired pressure amplitude pattern on the image plane. FIG. 8*b* shows an ideal phase pattern designed with GSW method and the actually measured phase pattern immediately behind the hologram, in accordance with some embodiments. FIG. 8*b* compares the ideal phase, which is calculated with the GSW algorithm, and the measured phase right behind the hologram. The measured phase agrees well with the desired one, with some small discrepancies that are likely caused by minor fabrication defects. FIG. 8*c* shows the simulated field patterns (amplitude) at three representative depths compared to those actually measured, in accordance with some embodiments. FIG. 8*c* presents the simulated amplitude pattern on the image plane according to ASA and the measured pattern, where an 'A' is clearly legible. The reconstruction quality can be further improved by using larger holograms with more pixels. We also note the reconstruction of the design pattern preserves over a relatively broad bandwidth. From 3750 Hz to 4500 Hz, the measured amplitude patterns on the image plane possess good consistency with the designed 'A' pattern (see FIG. 13 for the measured field patterns at these frequencies), indicating an operating bandwidth of more than 18.75% of the central frequency of 4000 Hz. The relative broad bandwidth is caused by the non-resonant nature of the constituting labyrinthine unit cells.

Figure 9:
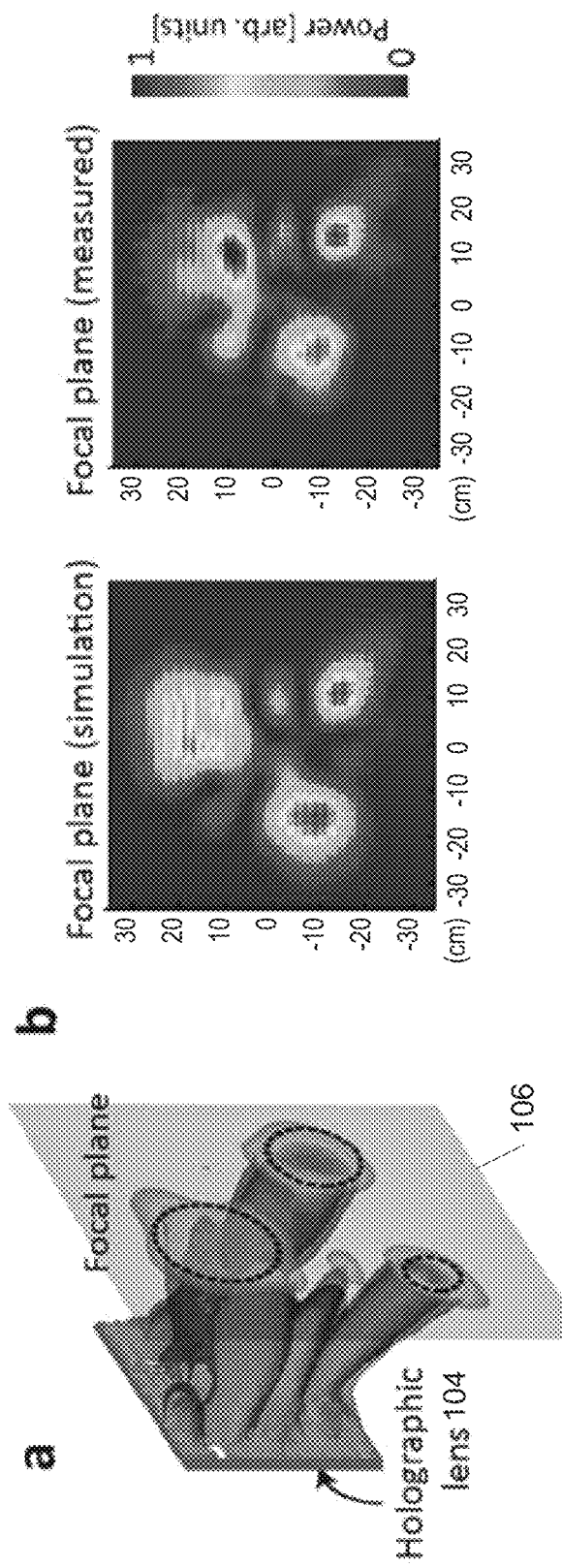
FIG. 9a illustrates experimental results of the holographic lensing of three circular spots of different diameters with a holographic lens, in accordance with some embodiments.
FIG. 9b shows the simulated and measured power distribution patterns at the depth of 300 mm associated with FIG. 4a, in accordance with some embodiments.

FIG. 9*a* illustrates experimental results of the holographic lensing of three circular spots of different diameters with a holographic lens, in accordance with some embodiments. FIG. 9*b* shows the simulated and measured power distribution patterns at the depth of 300 mm associated with FIG. 9*a*, in accordance with some embodiments.

Figure 10:
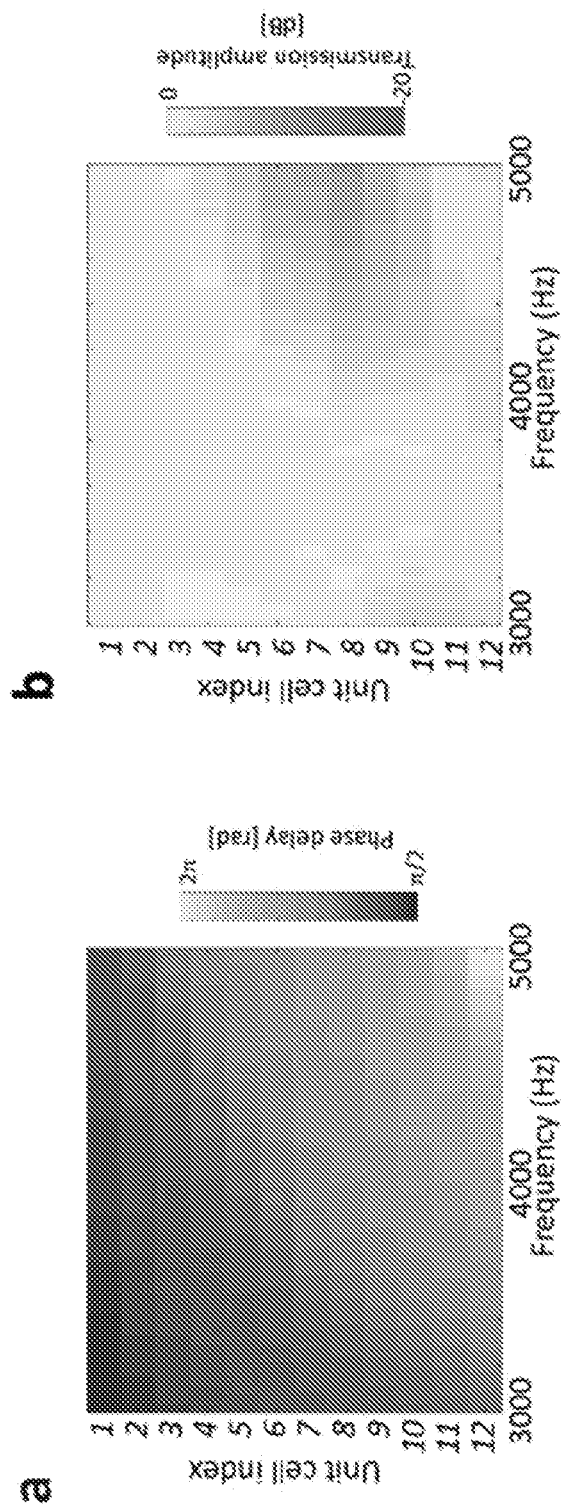
FIG. 10a illustrates the retrieved transmission phase delays for a set of 12 labyrinthine unit cells optimized for the hologram design over the frequency span from 3 to 5 kHz, in accordance with some embodiments.
FIG. 10b illustrates the retrieved transmission amplitudes for a set of 12 labyrinthine unit cells optimized for the hologram design over the frequency span from 3 to 5 kHz, in accordance with some embodiments.

FIG. 10*a* illustrates the retrieved transmission phase delays for the set of 12 labyrinthine unit cells optimized for the hologram design over the frequency span from 3 to 5 kHz, in accordance with some embodiments. FIG. 10*b* illustrates the retrieved transmission amplitudes for the set of 12 labyrinthine unit cells optimized for the hologram design over the frequency span from 3 to 5 kHz, in accordance with some embodiments.

Besides projecting a complex pattern, here we also demonstrate that the proposed acoustic metasurface holograms can be used as advanced holographic lenses. Acoustic lensing techniques are indispensable for imaging and energy deposition with acoustic waves. Conventional acoustic lens designs generally rely on Lens-maker's formulas or diffraction controls and are thus limited for designing advanced lenses with multiple tailored wavefront-shaping characteristics. The design of holographic lenses, in contrast, brings about unprecedented degrees-of-freedom in designs to create lensing with complex focal patterns. The focal spots are treated as the projected pattern and similar procedures can be followed by that for designing a general computer generated hologram. Here we demonstrate that the acoustic metasurface-based holograms can be used to achieve such a holographic lensing. Starting from a desired power distribution pattern of multiple focal points on the imaging plane (e.g., three focal spots with different sizes as shown on the focal plane in FIG. 9*a*), we can obtain an optimized phase distribution for the lens using the same GSW algorithm. FIG. 9*a* shows the iso-surface of power and the projected power pattern of energy hot spots on the focal plane (300 mm behind the hologram). FIG. 9*b* compares the simulated (with ASA) and the measured power distribution, where three focal points are clearly resolved at the expected locations with the one on the bottom right having the smallest size. Also observed was the relatively broad bandwidth for such lensing effects.

Figure 11:
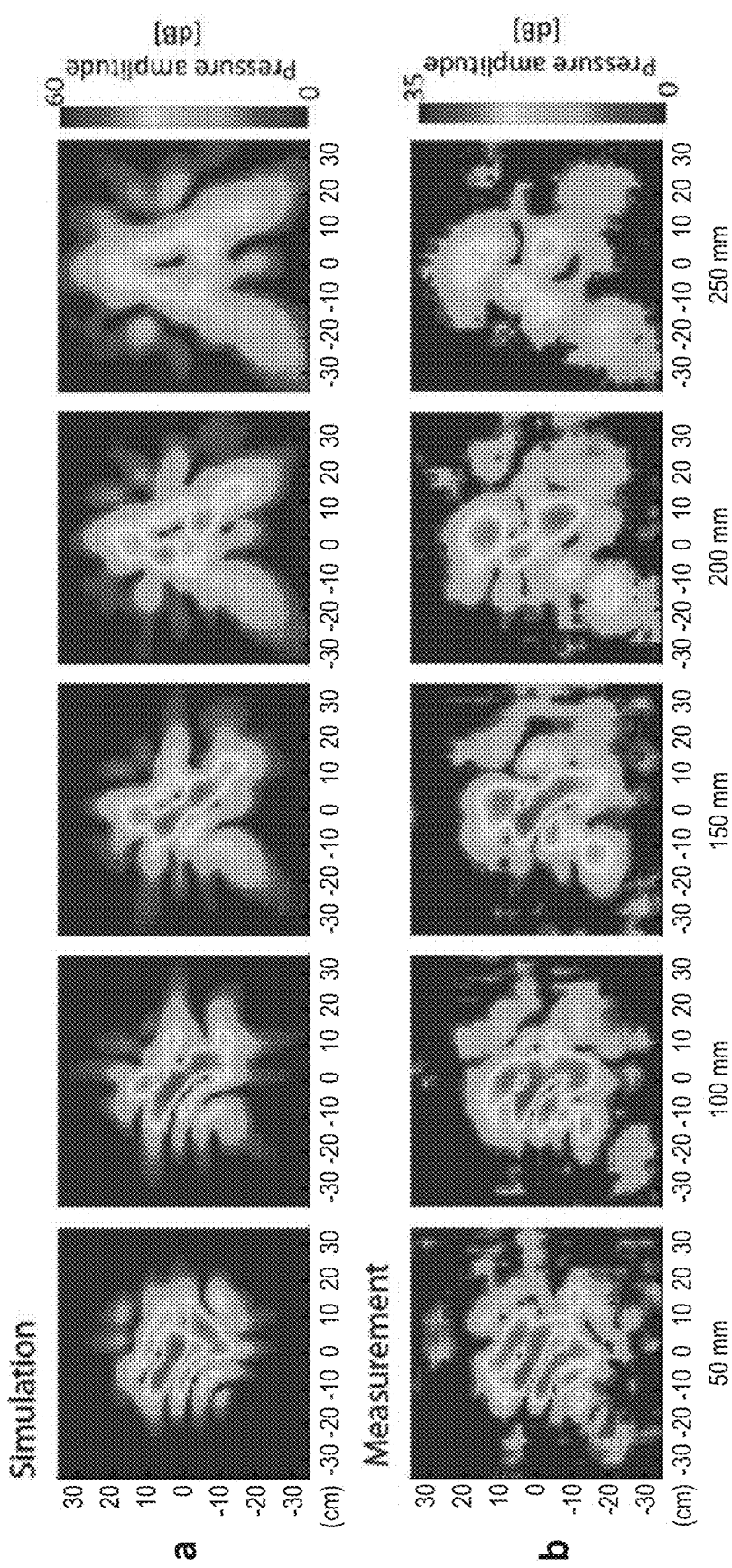
FIG. 11a illustrates the simulated field patterns (amplitude) obtained from Angular Spectrum calculation at the depth from 50 mm to 250 mm, with 50 mm interval for the hologram that projects an 'A,' in accordance with some embodiments.
FIG. 11b illustrates the measured field patterns at the depth from 50 mm to 250 mm, with 50 mm interval for the hologram that projects an 'A,' in accordance with some embodiments.

FIG. 11*a* illustrates the simulated field patterns (amplitude) obtained from Angular Spectrum calculation at the depth from 50 mm to 250 mm, with 50 mm interval for the hologram that projects an 'A,' in accordance with some embodiments. FIG. 11*b* illustrates the measured field patterns at the depth from 50 mm to 250 mm, with 50 mm interval for the hologram that projects an 'A,' in accordance with some embodiments. Excellent agreement between the measurements and the simulations were observed at the various depths shown in FIGS. 11*a* and 11*b*.

Figure 12:
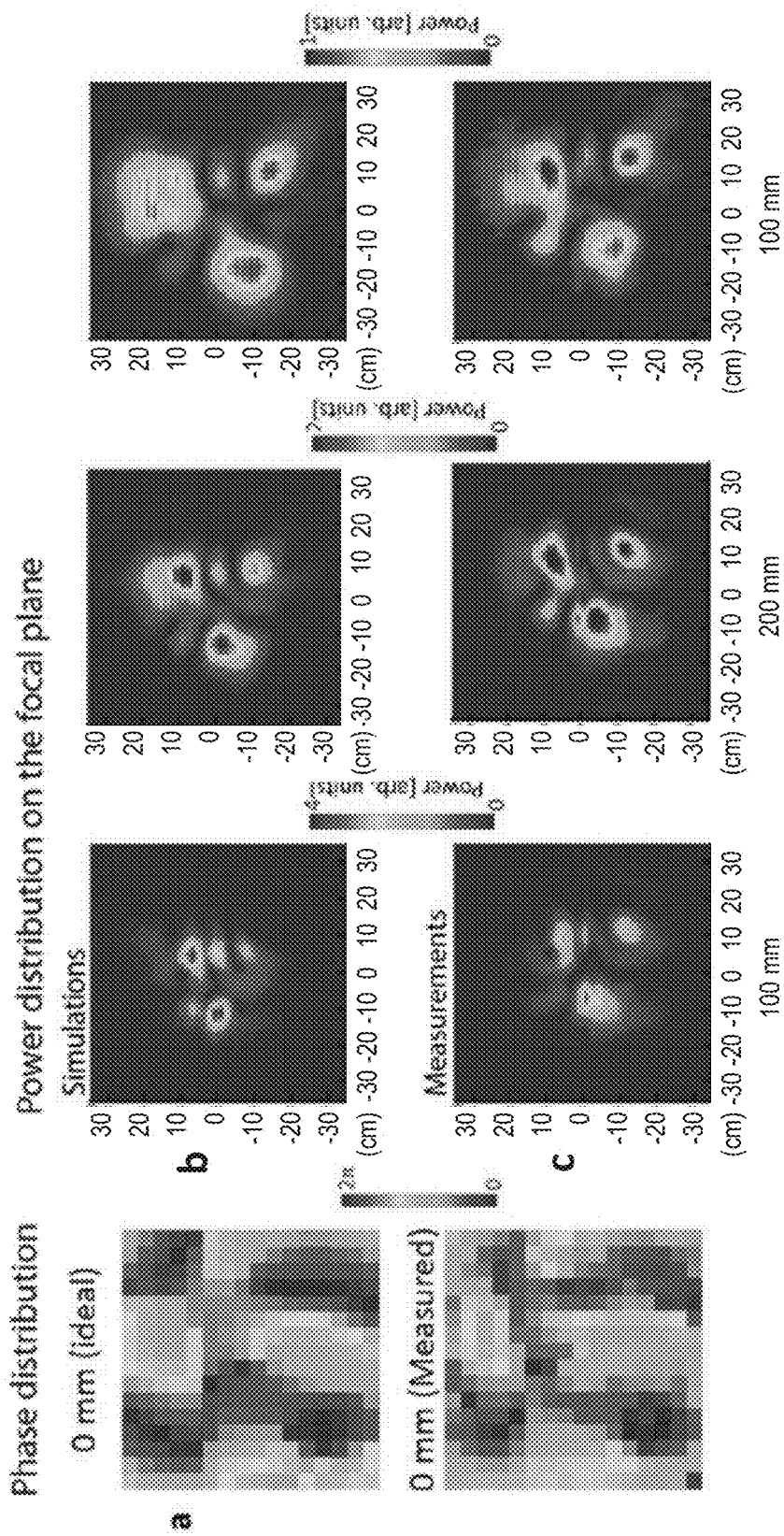
FIG. 12a illustrates the simulated phase distributions, obtained from Angular Spectrum calculation, behind the holographic lens and the field patterns (amplitude) at the depth from 100 mm to 300 mm, with 100 mm interval, for the multi-focal lensing, in accordance with some embodiments.
FIG. 12b illustrates the measured phase distributions behind the holographic lens and the field patterns (amplitude) at the depth from 100 mm to 300 mm, with 100 mm interval, for the multi-focal lensing, in accordance with some embodiments.

FIG. 12*a* illustrates the simulated phase distributions, obtained from Angular Spectrum calculation, behind the holographic lens and the field patterns (amplitude) at the depth from 100 mm to 300 mm, with 100 mm interval, for the multi-focal lensing, in accordance with some embodiments. FIG. 12b illustrates the measured phase distributions behind the holographic lens and the field patterns (amplitude) at the depth from 100 mm to 300 mm, with 100 mm interval, for the multi-focal lensing, in accordance with some embodiments. Excellent agreement between the measurements and the simulations were observed at these depths.

Figure 13:
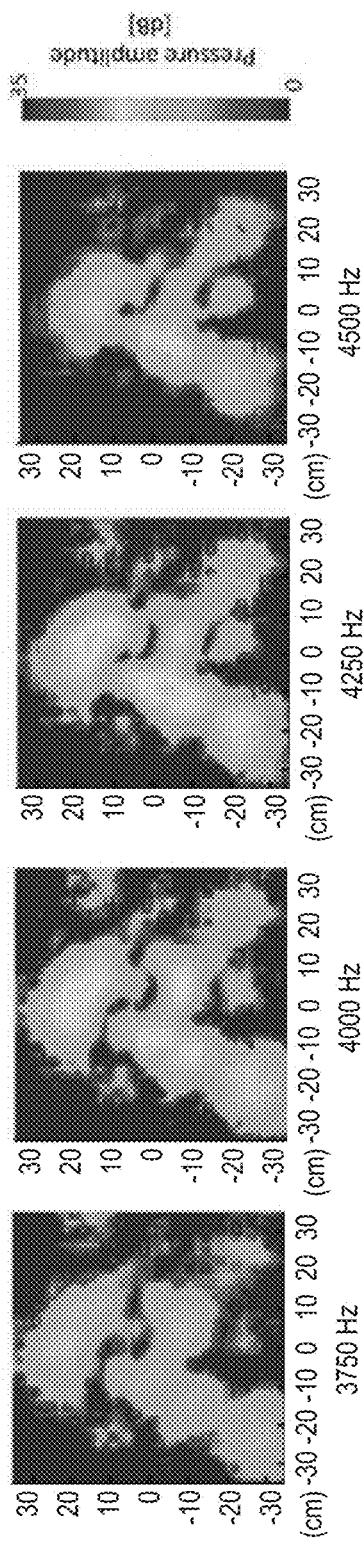
FIG. 13 illustrates the measured field patterns at different frequencies on the designed reconstruction plane (300 mm) for the holographic reconstruction of the pattern 'A,' in accordance with some embodiments.
Figure 14:
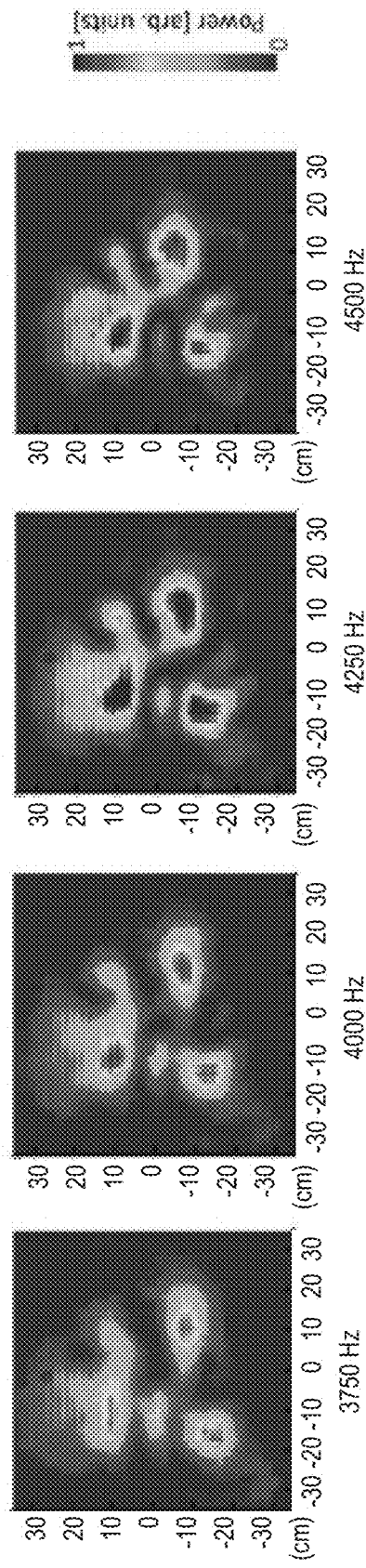
FIG. 14 illustrates the measured field patterns at different frequencies on the designed reconstruction plane (300 mm) for the holographic lensing of three focal spots, in accordance with some embodiments.

FIG. 13 illustrates the measured field patterns at different frequencies on the designed reconstruction plane (300 mm) for the holographic reconstruction of the pattern 'A,' in accordance with some embodiments. FIG. 14 illustrates the measured field patterns at different frequencies on the designed reconstruction plane (300 mm) for the holographic lensing of three focal spots, in accordance with some embodiments.

As shown in FIGS. 13 and 14, the measured focal patterns remain relatively constant over the bandwidth from 3750 Hz to 4500 Hz, and all three desired focal spots are clearly identifiable at the designed locations (FIG. 14 shows the measured focal patterns at these frequencies). Such advanced tailored control over multiple focal spots with passive acoustic metasurface holograms open the door to a large variety of potential applications, such as wireless power transfer medical therapy and neural engineering.

While we demonstrate here various functionalities with phase holograms, complete control over both amplitude and phase is possible using labyrinthine acoustic metamaterials. With advanced manufacturing technologies, the proposed holograms can also be scaled down to the ultrasonic range. The underwater version of our proposed acoustic metasurface hologram would involve more complications but in principle should be possible. We expect that the proposed acoustic metasurface holograms will become a platform for a large variety of wave-based signal processing and modulation functionalities.

To conclude, we have designed, fabricated, and tested two acoustic metasurface holograms. We expect that the results of this paper will open a new realm of holographic acoustic wave manipulation with acoustic metamaterials or metasurfaces. The passive holograms will not only be useful for audio reconstruction, but may also be valuable for various advanced functionalities, such as creating acoustic mirages or illusive objects, generating radiation force to levitate and manipulate objects, serving as wave-based analog computational platforms where acoustic signals can be processed directly without digitization. Such holograms can also in principle be applied to the ultrasonic regime, to achieve multi-focal lensing for targeted drug delivery and noncontact tactile display and precise neural stimulation.

Any patents or publications mentioned in this specification are indicative of the levels of those skilled in the art to which the invention pertains. These patents and publications are herein incorporated by reference to the same extent as if each individual publication was specifically and individually indicated to be incorporated by reference. In case of conflict, the present specification, including definitions, will control.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed.

Various features and advantages of some embodiments are set forth in the following claims.

What is claimed is:

1. A method for generating a controlled sound field, the method comprising:
receiving a sound wave emitted from a sound source;
determining, with an electronic processor, a pattern of at least one selected from a group consisting of an amplitude change and a phase change necessary to create a desired sound field using the sound wave, wherein the desired sound field includes a two-dimensional acoustic projection at an image plane that is perpendicular to a direction of the sound wave emitted from the sound source;
determining, with the electronic processor, a plurality of passive sound-modulating elements arranged in a two-dimensional array needed to generate the pattern of the at least one of the amplitude change and the phase change, wherein each passive sound-modulating element in the two-dimensional array is selected from a set of different types of passive sound-modulating elements each corresponding to a different phase change magnitude, wherein the two-dimensional array is arranged perpendicular to the direction of the sound wave emitted from the sound source; and
constructing the two-dimensional array including the plurality of sound-modulating elements to generate the controlled sound field.

2. The method of claim 1, wherein each type of passive sound-modulating element in the set of different types of passive sound-modulating elements includes labyrinthine structure configured to receive an input sound at a first end and emit a phase-shifted output sound at a second end.

3. The method of claim 1, wherein determining the plurality of passive sound-modulating elements arranged in the two-dimensional array includes determining dimensions of the two-dimensional array of the plurality of passive sound-modulating elements.

4. The method of claim 3, wherein a height and a width of each of the plurality of passive sound-modulating elements are smaller than a wavelength of the sound wave.

5. The method of claim 1, wherein providing the sound source to generate the sound wave includes propagating the sound wave through a liquid medium.

6. The method of claim 1, wherein providing the sound source to generate the sound wave includes propagating the sound wave through an organic tissue.

7. The method of claim 1, wherein constructing the two-dimensional array including the plurality of sound-modulating elements to generate the sound field includes constructing the plurality of sound-modulating elements using a three dimensional printer.

8. The method of claim 1, wherein determining the pattern of the at least one selected from the group consisting of the amplitude change and the phase change includes determining a target phase change for each element in a two-dimensional array,
wherein determining the plurality of passive sound-modulating elements arranged in the two-dimensional array includes selecting, for each element in the two-dimensional array, the type of passive sound-modulating element from the set of different types of passive sound-modulating elements that corresponds to the determined target phase change for the element,
wherein each type of passive sound-modulating element in the set of different types of passive sound-modulating elements includes a pair of internal projections curved towards an intertwining spiral arrangement, and
wherein a length of the curved internal projections is different in each type of passive sound-modulating element and corresponds to a phase change magnitude of the type of passive sound-modulating element.

9. The method of claim 1, wherein determining the pattern of the at least one selected from the group consisting of the amplitude change and the phase change includes determining a target output phase for each element of the two-dimensional array as $$\varphi_n = \arg\left\{\sum_m w_m e^{ikd_{mn}} \frac{p_m}{|p_m|}\right\}$$

where $\varphi_n$ is the target output phase for element n, m is a target pixel in the two-dimensional acoustic projection at the image plane, $w_m$ is a weight coefficient for the target pixel m, k is a wavenumber of the sound wave emitted from the sound source, $d_{mn}$ is a distance between the element n and the target pixel m, and $p_m$ is a target sound pressure at the target pixel m.

10. A holographic imaging system for generating a controlled sound field, the holographic imaging system including:
a sound source generating a sound wave;
a metamaterial-based device including a plurality of passive sound-modulating elements arranged in a two-dimensional array arranged perpendicular to a direction of the sound wave generated by the sound source, wherein the metamaterial-based device generates a pattern of at least one selected from a group consisting of an amplitude change and a phase change necessary to create a desired sound field using the sound wave, wherein the desired sound field includes a two-dimensional acoustic projection at an image plane; and
the image plane to capture the desired sound field.

11. The holographic imaging system of claim 10, wherein the plurality of passive sound-modulating elements include a plurality of labyrinthine structures.

12. The holographic imaging system of claim 10, wherein the metamaterial-based device is configured to create the desired sound field using a transmission of the sound wave.

13. The holographic imaging system of claim 10, wherein the metamaterial-based device is configured to create the desired sound field using a reflection of the sound wave.

14. The holographic imaging system of claim 10, wherein each passive sound-modulating element of the plurality of passive sound-modulating elements includes a labyrinth structure with a pair of internal projections curved towards an intertwining spiral arrangement, and wherein a length of the curved internal projections corresponds to a phase change magnitude of the passive sound-modulating element.

15. A non-transitory computer-readable medium containing computer-executable instructions that when executed by one or more electronic processors cause the one or more electronic processors to
determine a pattern of at least one of an amplitude change and a phase change necessary to create a desired sound field from a sound wave emitted from a single sound source, wherein the desired sound field includes a two-dimensional acoustic projection at an image plane that is perpendicular to a direction of the sound wave;
determine a plurality of passive sound-modulating elements arranged in a two-dimensional array needed to generate the pattern of at least one of the amplitude change and the phase change, wherein each passive sound-modulating element in the two-dimensional array is selected from a set of different types of passive sound-modulating elements each corresponding to a different phase change magnitude, wherein the two-dimensional array is arranged perpendicular to the direction of the sound wave emitted from the sound source; and
construct the two-dimensional array including the plurality of sound-modulating elements to generate the sound field.

16. The non-transitory computer-readable medium of claim 15, wherein the instructions, when executed by the one or more electronic processors, cause the one or more electronic processors to
determine each passive sound-modulating element of the plurality of passive sound-modulating elements by selecting a type of passive sound-modulating element from the set of different types of passive sound-modulating elements each having a labyrinthine structure.

17. The non-transitory computer-readable medium of claim 15, wherein the instructions, when executed by the one or more electronic processors, further cause the one or more electronic processors to determine dimensions of the two-dimensional array of the plurality of passive sound-modulating elements.

18. The non-transitory computer-readable medium of claim 15, wherein the instructions, when executed by the one or more electronic processors, cause the one or more electronic processors to construct the two-dimensional array including the plurality of sound-modulating elements by constructing the plurality of sound-modulating elements using a three dimensional printer.

19. The non-transitory computer-readable medium of claim 15, wherein the instructions, when executed by the one or more electronic processors, cause the one or more electronic processors to:
determine the pattern of the at least one selected from the group consisting of the amplitude change and the phase change by determining a target phase change for each element in a two-dimensional array; and
determine the plurality of passive sound-modulating elements arranged in the two-dimensional array by selecting, for each element in the two-dimensional array, the type of passive sound-modulating element from the set of different types of passive sound-modulating elements that corresponds to the determined target phase change for the element, wherein each type of passive sound-modulating element in the set of different types of passive sound-modulating elements includes a pair of internal projections curved towards an intertwining spiral arrangement, and wherein a length of the curved internal projections is different in each type of passive sound-modulating element and corresponds to a phase change magnitude of the type of passive sound-modulating element.

20. The non-transitory computer-readable medium of claim 15, wherein the computer-executable instructions, when executed by the one or more electronic processors, cause the one or more electronic processors to determine the pattern of the at least one selected from the group consisting of the amplitude change and the phase change by determining a target output phase for each element of the two-dimensional array as $$\varphi_n = \arg\left\{\sum_m w_m e^{ikd_{mn}} \frac{p_m}{|p_m|}\right\}$$

where $\varphi_n$ is the target output phase for element n, m is a target pixel in the two-dimensional acoustic projection at the image plane, $w_m$ is a weight coefficient for the target pixel m, k is a wavenumber of the sound wave emitted from the sound source, $d_{mm}$ is a distance between the element n and the target pixel m, and $p_m$ is a target sound pressure at the target pixel m.

* * * * *